United States Patent
Aoki et al.

[11] Patent Number: 6,059,461
[45] Date of Patent: May 9, 2000

[54] OPTICAL FIBER CONNECTOR ASSEMBLY

[75] Inventors: Kazunori Aoki, Sagamihara; Tatsuo Inoue, Tokyo; Shinsuke Kunishi, Hadano, all of Japan

[73] Assignee: Molex Corporation, Lisle, Ill.

[21] Appl. No.: 08/966,086

[22] Filed: Nov. 7, 1997

[30] Foreign Application Priority Data

Nov. 13, 1996 [JP] Japan .................................... 8-317012

[51] Int. Cl.[7] .................................................... G02B 6/38
[52] U.S. Cl. ................... 385/60; 385/59; 385/78
[58] Field of Search ........................... 385/70–72, 76–78, 385/59, 60

[56] References Cited

U.S. PATENT DOCUMENTS

| | | | |
|---|---|---|---|
| 5,325,454 | 6/1994 | Rittle et al. | 385/76 |
| 5,386,487 | 1/1995 | Briggs et al. | 385/59 |
| 5,567,179 | 10/1996 | Voltz | 439/578 |
| 5,579,425 | 11/1996 | Lampert et al. | 385/59 |
| 5,673,346 | 9/1997 | Iwano et al. | 385/60 |
| 5,809,192 | 9/1998 | Manning et al. | 385/78 |

FOREIGN PATENT DOCUMENTS

| | | |
|---|---|---|
| 05 69 322 A1 | 4/1993 | European Pat. Off. . |
| 05 97 501 A1 | 11/1993 | European Pat. Off. . |
| 07 29 048 A1 | 8/1996 | European Pat. Off. . |

OTHER PUBLICATIONS

IBM Technical Disclosure Bulletin, pp. 377–378, vol. 38, No. 09 dated Sep. 1995.

*Primary Examiner*—John D. Lee
*Assistant Examiner*—Juliana K. Kang
*Attorney, Agent, or Firm*—A. A. Tirva

[57] ABSTRACT

An optical fiber connector assembly includes a connector housing having a plug-receiving cavity. A plug connector is provided for terminating an optical fiber and includes a forward mating end for surrounding a core of the fiber. The plug connector includes a rearward engaging portion for selective interengagement with a second plug connector in parallel with the first plug connector. The forward mating end is insertable into the plug-receiving cavity of the connector housing while the rearward engaging portion is exposed exteriorly of the cavity when the mating end is fully inserted into the cavity. Therefore, the plug connector can be used individually with the connector housing or interengaged with the second plug connector.

16 Claims, 18 Drawing Sheets

OPTICAL FIBER CONNECTOR ASSEMBLY

FIELD OF THE INVENTION

This invention generally relates to the art of optical fiber connectors and, particularly, to a connector assembly for accommodating one or a plurality of optical fiber connectors.

BACKGROUND OF THE INVENTION

It is known to provide a connector assembly which is capable of connecting a plurality of optical fiber connectors in a side-by-side or parallel arrangement. Such an arrangement of parallel connectors may be coupled together to circuit components on a printed circuit board, for instance, or they may be mounted together in an appropriate panel. Typically, the connectors are plug-type connectors for insertion into an assembly housing in their parallel arrangement. Therefore, each connector includes a plug end. In addition, the connectors include some form of interengaging means on the sides thereof to interconnect the connectors in their side-by-side or parallel arrangement. The interengaged connectors then can be inserted into a plug-receiving cavity in the assembly housing. The interengaging means on the sides of the connectors may be complementary interengaging male and female engaging portions, for instance.

In most prior art optical fiber connector assemblies of the character described above, the male and female engaging portions on the sides of the connectors are fully or at least partially inserted into the plug-receiving cavity of the housing. Typically, the plug-receiving cavity is defined by a single enlarged opening extending laterally for receiving the entire arrangement of interengaged parallel connectors. In other words, the plug-receiving cavity of the connector housing cannot receive and hold a single connector independently. In addition, the male and female engaging portions on the sides of the connectors often extend all the way to plug ends of the connectors.

While prior art optical fiber connector assemblies as described above are effective in simultaneously coupling a plurality of parallel connectors and then inserting the connectors into a plug-receiving cavity of an assembly housing, problems are encountered when it is desirable to use less than the entire number of connectors which are accommodated by the plug-receiving cavity. In other words, if an assembly is designed to interconnect three optical fiber cores in a single assembly, there may be occasions where all three of the optical fiber cores are not required to be connected at the same time, depending upon the specifications or parameters for the optical transmission system with which the connectors are being used. If it is desired to connect only one optical fiber core, a single connector cannot be accommodated by the connector housing.

Furthermore, when a single optical fiber connector is to be inserted into the optical connector housing, it would be desirable to be able to insert the single connector in any circumferentially oriented position whereby the single connector can be freely mated in the assembly housing. This is not possible with the prior art described above, because the assembly is designed primarily for accommodating a plurality of individual connectors coupled together in a parallel arrangement.

The present invention is directed to solving these various problems by providing an optical fiber connector assembly which not only can accommodate a varying number of individual optical fiber connectors, but an individual connector can be freely mated without regard to its circumferential orientation.

SUMMARY OF THE INVENTION

An object, therefore, of the invention is to provide a new and improved optical fiber connector assembly of the character described.

In the exemplary embodiment of the invention, the assembly includes a connector housing having a plug-receiving cavity. A plug connector is provided for terminating an optical fiber and includes a forward mating end for surrounding a core of the optical fiber and a rearward engaging portion for selective interengagement with a second plug connector in parallel with the first plug connector. The forward mating end of the plug connector is insertable into the plug-receiving cavity of the connector housing while the rearward engaging portion is exposed exteriorly of the cavity when the mating end is fully inserted into the cavity.

The invention contemplates that the forward mating end of the plug connector is generally cylindrical. Therefore, the plug connector can be inserted into the cavity in any circumferentially oriented position independently of the second plug connector. The plug-receiving cavity of the connector housing has independent cavity portions for respectively receiving any one or all of the plug connectors independently of each other.

As disclosed herein, the rearward engaging portion of each plug connector includes a male engaging portion on one side thereof and a female engaging portion on an opposite side thereof. The male and female engaging portions are oriented for interengagement of the connectors in a direction generally perpendicular to the direction of inserting the plug connector into the cavity.

Other features of the invention include the provision of a holder for holding the plurality of plug connectors in parallel interengagement. Complementary interengaging latch means are provided between the holder and the connector housing. The housing may have mounting ears for mounting in an appropriate panel, or the housing may be adapted for receiving an optical element on a printed circuit board.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
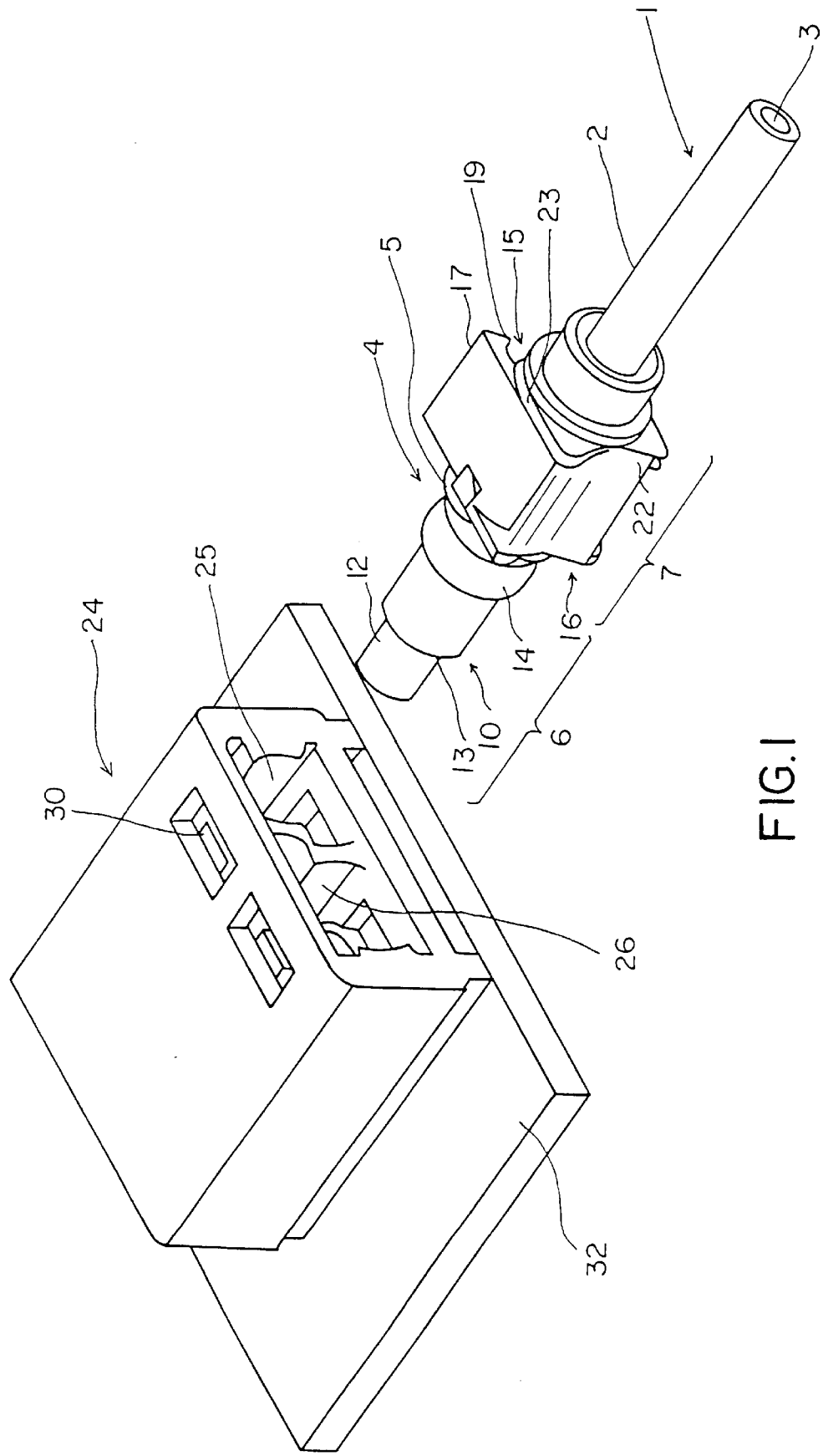
FIG. 1 is a perspective view of a first embodiment of an optical fiber connector assembly according to the invention, showing a single plug connector about to be inserted into the housing.

Referring to the drawings in greater detail, and first to FIGS. 1–9, an optical fiber cable, generally designated 1, includes an outer cladding 2 surrounding a fiber core 3. A plug connector, generally designated 4, includes a plug body 5 having a forward mating end 6 and a rearward engaging portion 7. Forward mating end 6 includes a core passage 8 (FIG. 9) for receiving core 3 of the fiber optic cable, stripped of its cladding 2. Rearward engaging portion 7 includes a passage 9 for receiving the fully cladded optical fiber cable 1. Core passage 8 in forward mating end 6 is surrounded by a mating and holding means, generally designated 10, and which is generally cylindrical. More particularly, mating and holding means 10 includes a small diameter cylindrical portion 12, a tapered portion 13 and a rounded enlarged diameter ring portion 14.

Figure 3:
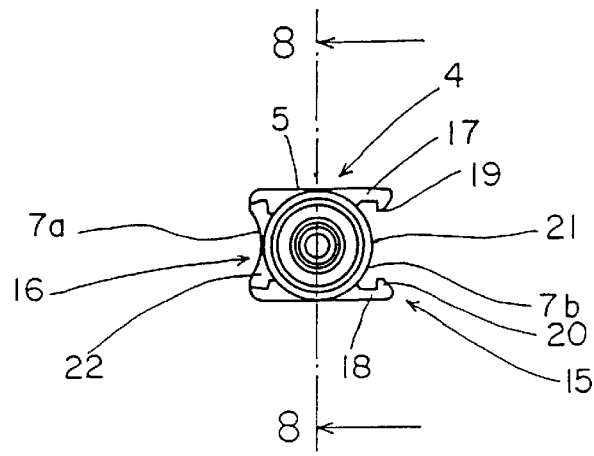
FIG. 3 is a front end elevational view of the plug connector.
Figure 4:
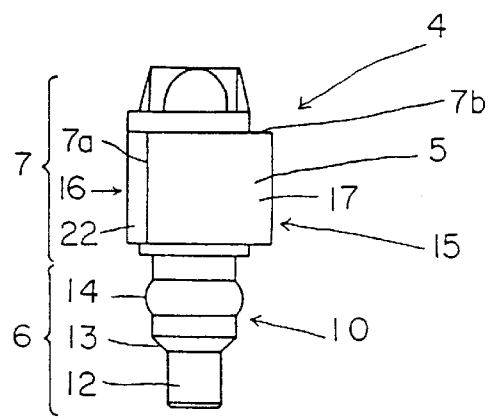
FIG. 4 is a top plan view of the plug connector.
Figure 5:
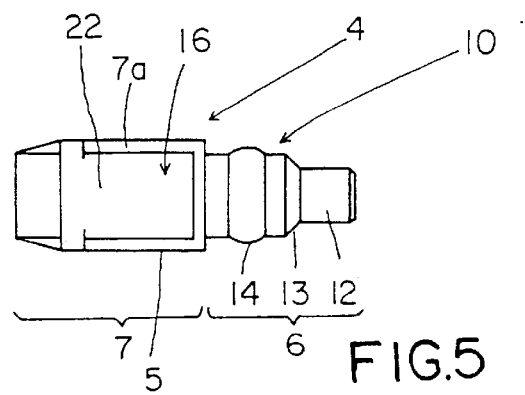
FIG. 5 is a side elevational view of the plug connector, looking toward the left-hand side of FIG. 3.
Figure 6:
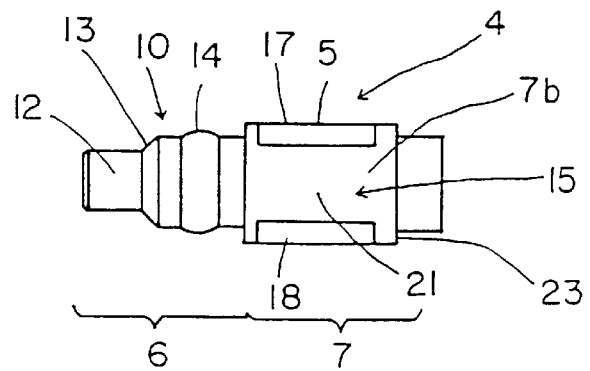
FIG. 6 is a side elevational view of the plug connector, looking toward the right-hand side of FIG. 3.
Figure 7:
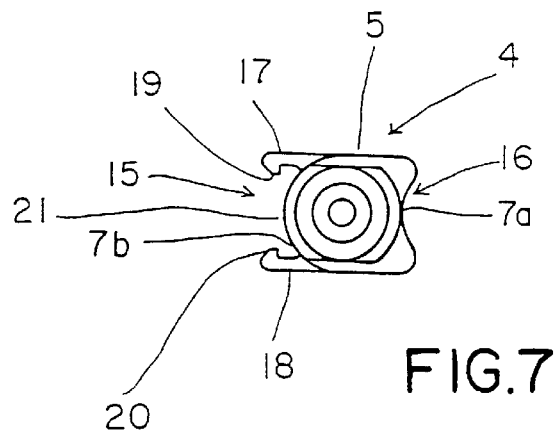
FIG. 7 is a rear end view of the plug connector.
Figure 8:
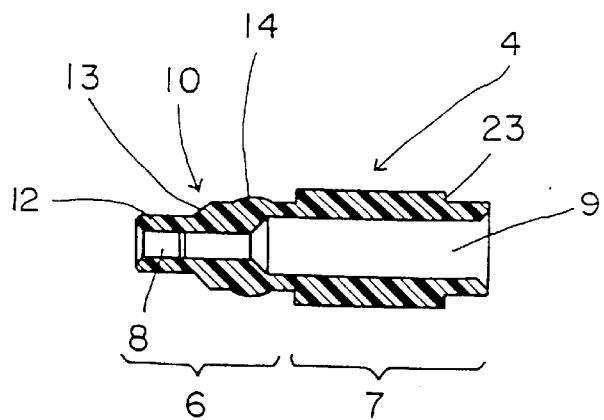
FIG. 8 is an axial section taken generally along line 8—8 of FIG. 3.

As best seen in FIG. 3, rearward engaging portion 7 of plug body 5 includes left and right side walls 7a and 7b, respectively, having male and female engaging portions 16 and 15, respectively, formed therein. Female engaging portion 15 includes a pair of opposed resilient arms 17 and 18 having inwardly directed latch hooks 19 and 20 at the distal ends of resilient arms 17 and 18. A male receiving space 21 is defined between resilient arms 17,18 and latch hooks 19,20. Male engaging portion 16 includes a projection 22 which is receivable into male receiving space 21 of female engaging portion 15. The plug body also has a rear stop portion 23.

Therefore, a plurality of plug connectors 4 having the same shape can be disposed in a side-by-side relationship and coupled in parallel to each other by inserting male engaging portion 16 of one plug connector into female engaging portion 15 of another plug connector. Latch hooks 19 and 20 on the distal ends of resilient arms 16 and 18 embrace opposite sides of male projection 22 to hold the connectors in their coupled parallel arrangement.

Figure 2:
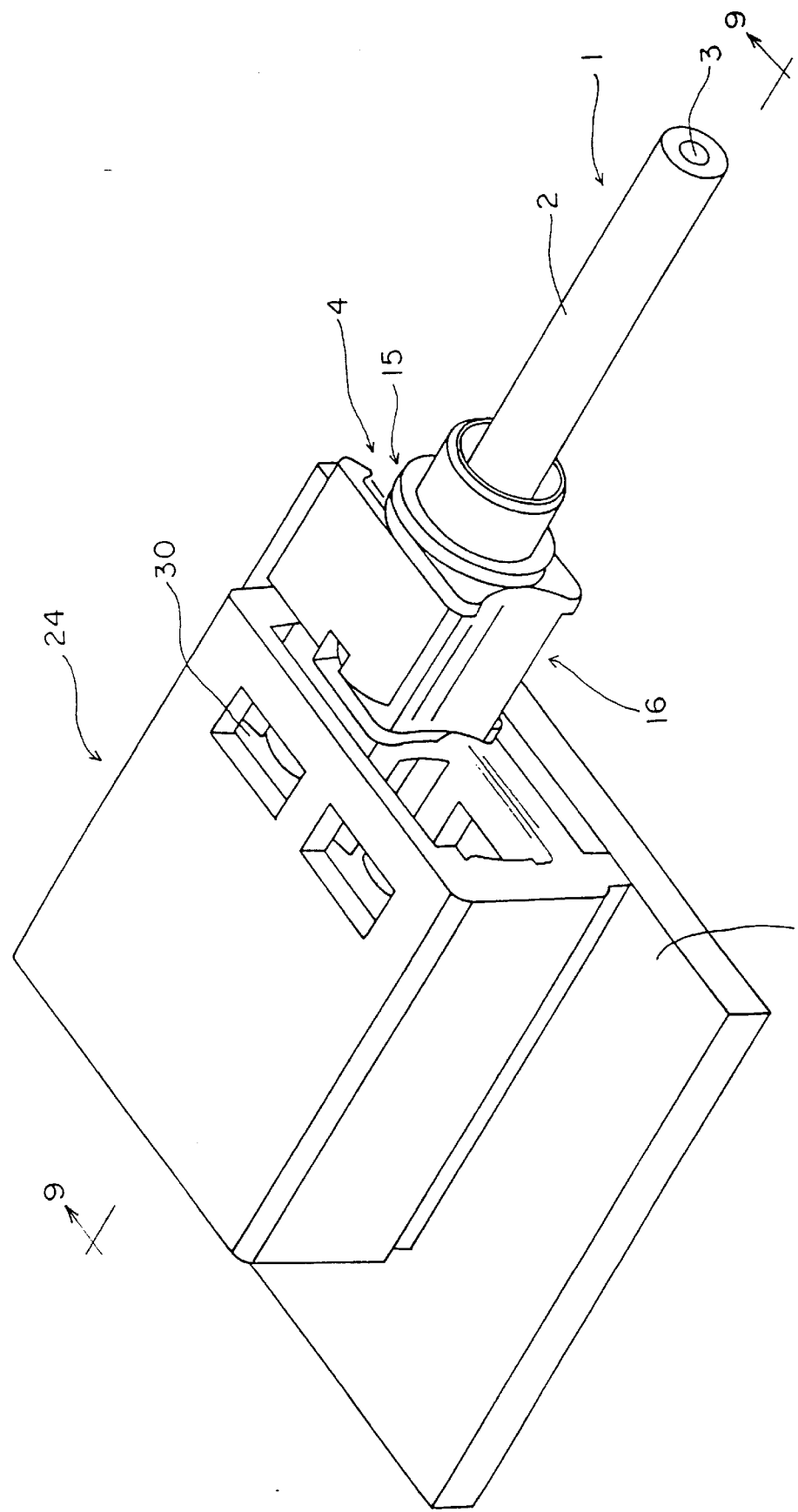
FIG. 2 is a view similar to that of FIG. 1, but showing the plug assembly inserted into the housing.

In the embodiment of FIGS. 1 and 2, the optical fiber connector assembly includes an assembly housing 24 having a plug-receiving cavity which includes two plug-receiving cavity portions 25 and 26 formed in the housing. Each plug-receiving cavity 25 and 26 has the same shape and includes a small diameter portion 27 shown in FIG. 9 for receiving the small diameter portion 12 of plug body 5. Each cavity also includes a tapered portion 28 against which tapered surface 13 of the plug body abuts, and an enlarged diameter portion 29 for receiving the enlarged diameter portion 14 of the plug body. Access openings 30 are provided in assembly housing 24 for communicating with the enlarged diameter portion 29 for receiving an appropriate tool for removing the plug connector from the cavity.

Figure 9:
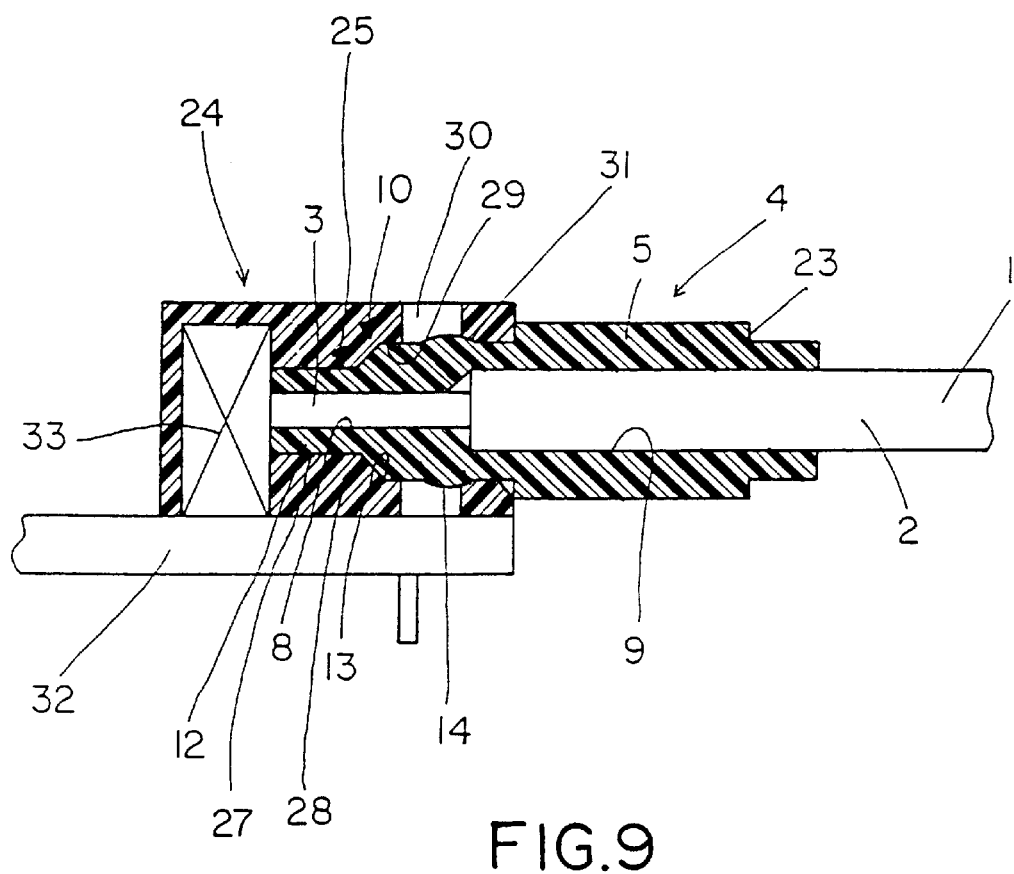
FIG. 9 is an axial section taken generally along line 9—9 of FIG. 2.

When plug connector 4 is fully inserted into cavity 25 of assembly housing 24 as shown in FIG. 9, a frictional fit is created in the area indicated at 31 to securely hold the plug connector within the cavity. Core 3 of fiber optic cable 1 is shown coupled to an optical component 33 on a printed circuit board 32 on top of which assembly housing 24 is mounted. It can be seen clearly in FIGS. 2 and 9 that when forward mating end 6 (FIG. 1), which includes mating and holding means 10, is inserted into plug-receiving cavity 25, rearward engaging portion 7 remains outside the plug-receiving cavity. With this construction, a plurality of plug-receiving cavities or cavity portions 25 and 26 can be formed independently in assembly housing 24 for independently receiving respective plug connectors. Regardless of whether one or more plug connectors are inserted into the assembly housing, each plug connector is independently and securely mounted within the housing so that a complete connection of the respective fiber core 3 is made independently of any other plug connector.

Figure 10:
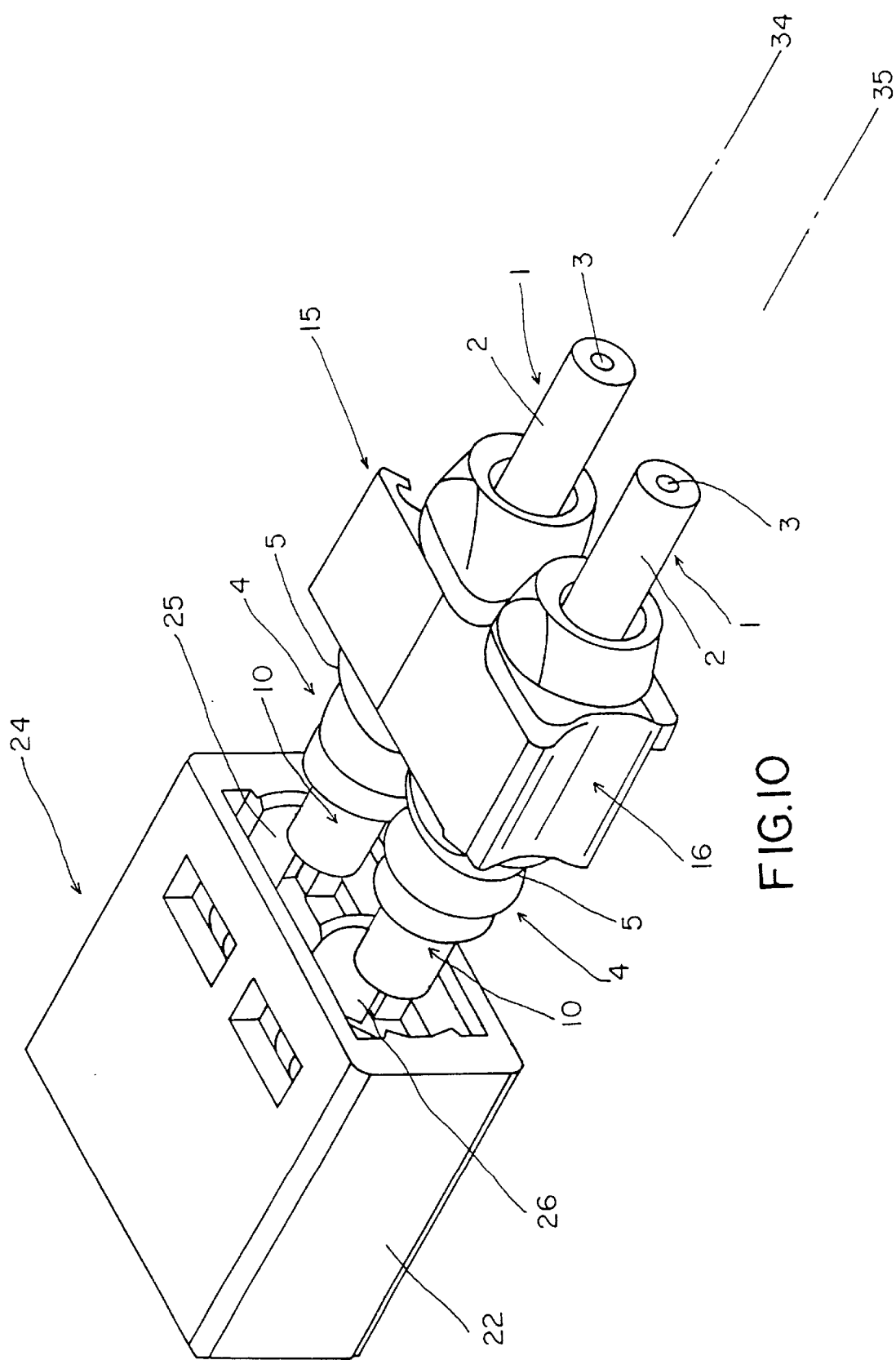
FIG. 10 is a view similar to that of FIG. 1, but showing two plug connectors coupled in parallel arrangement.
Figure 11:
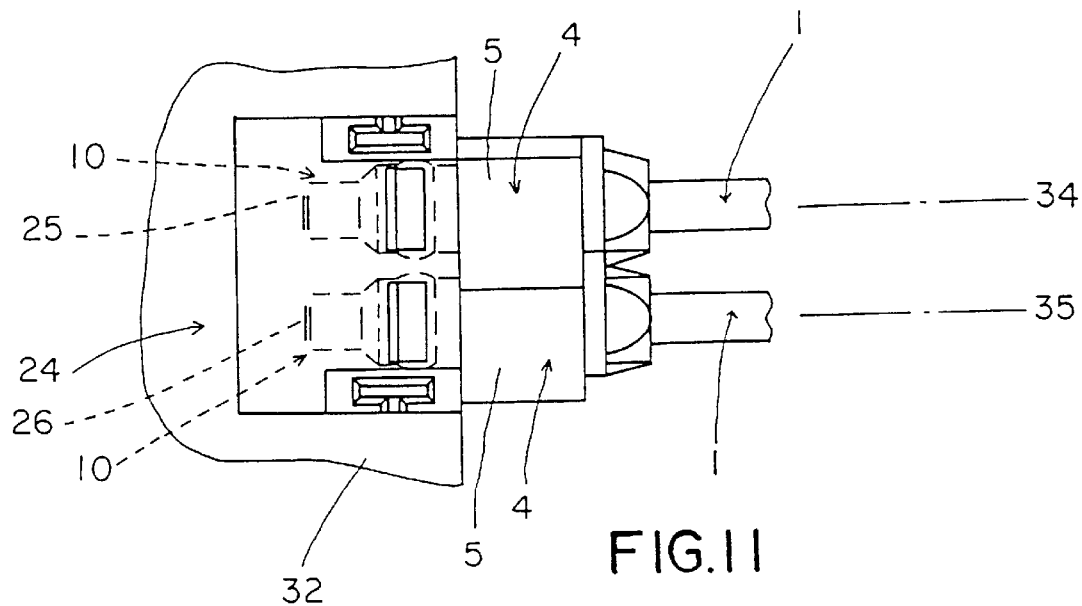
FIG. 11 is a top plan view showing the two parallel connectors inserted into the assembly housing.
Figure 12:
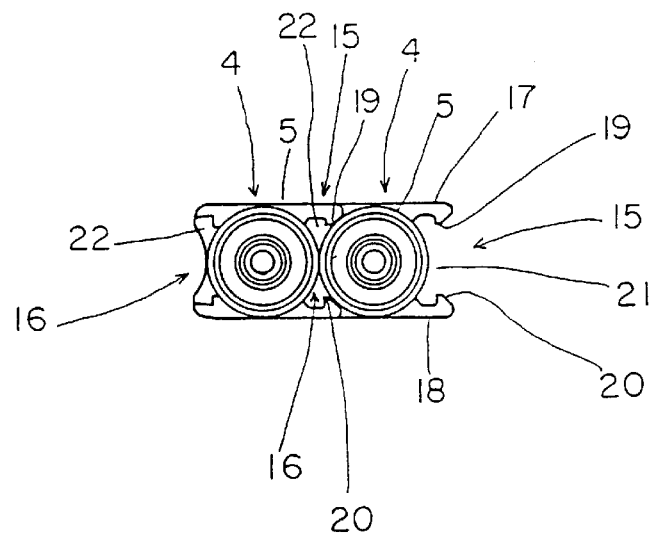
FIG. 12 is an end elevational view of the two plug connectors coupled in parallel arrangement.
Figure 13:
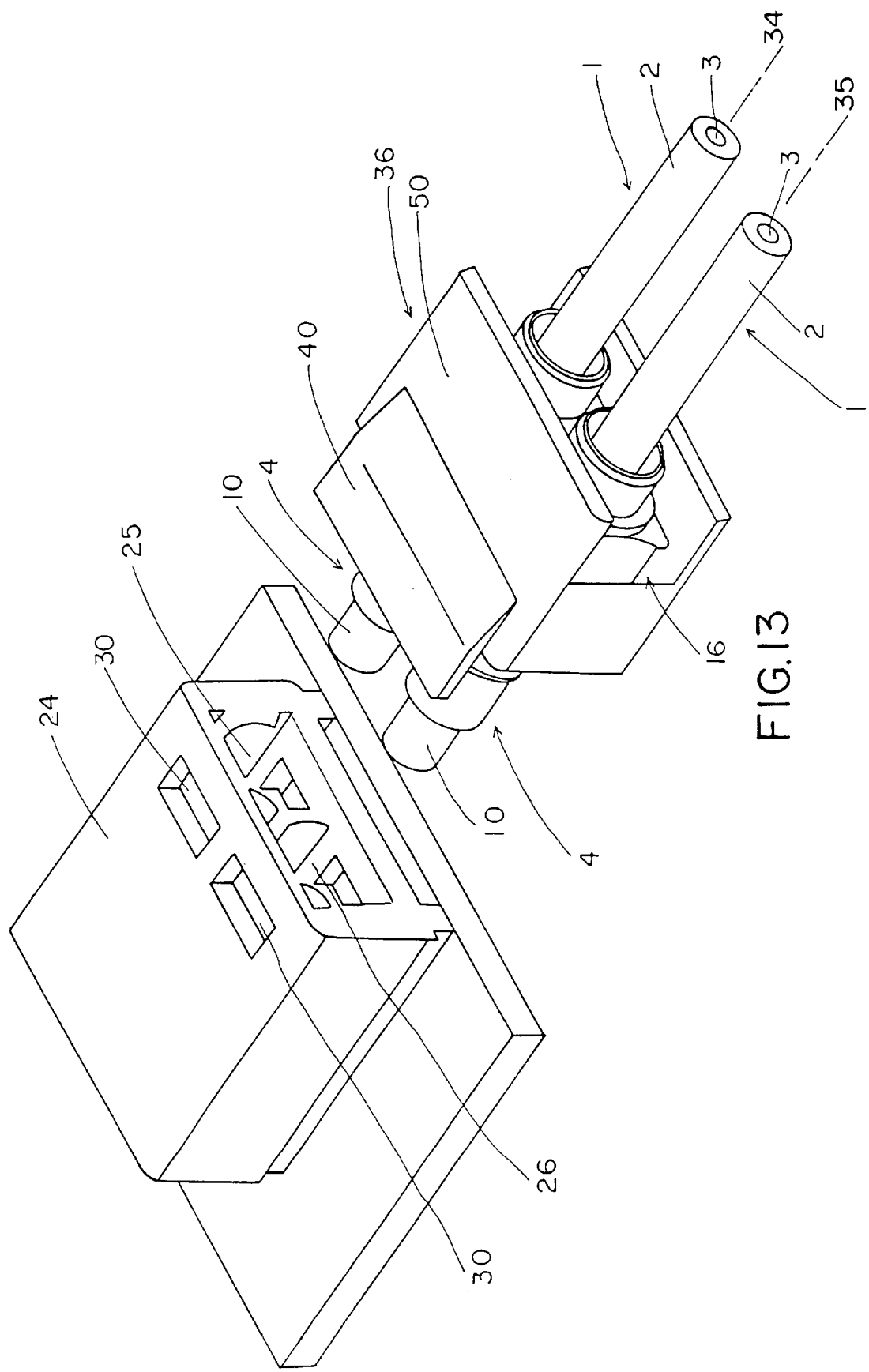
FIG. 13 is a view somewhat similar to that FIG. 10, but showing the assembly including a holder for the connectors.
Figure 14:
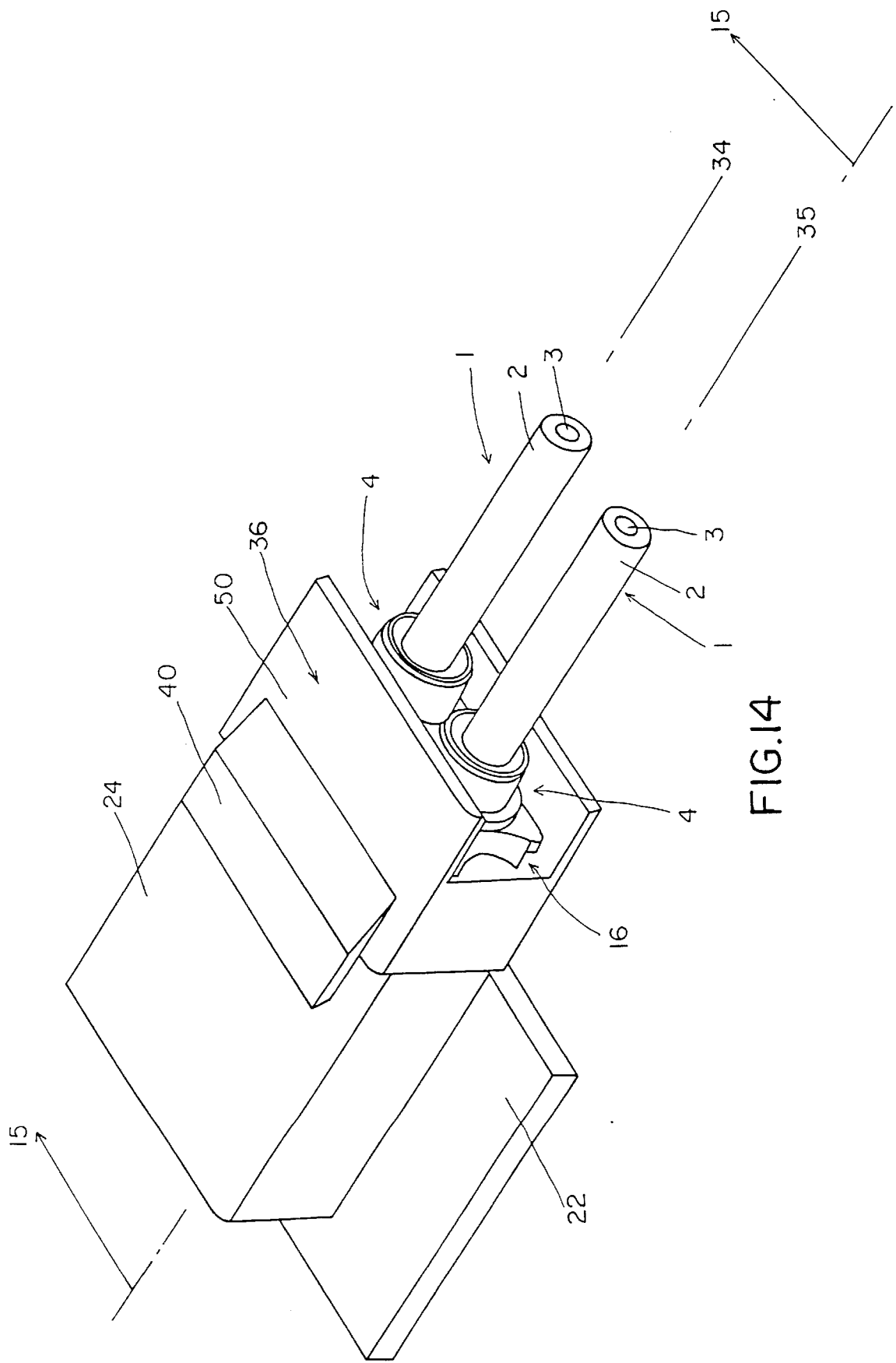
FIG. 14 is a view similar to that of FIG. 13, but showing the plug connectors inserted into the housing and the holder latched to the housing.
Figure 15:
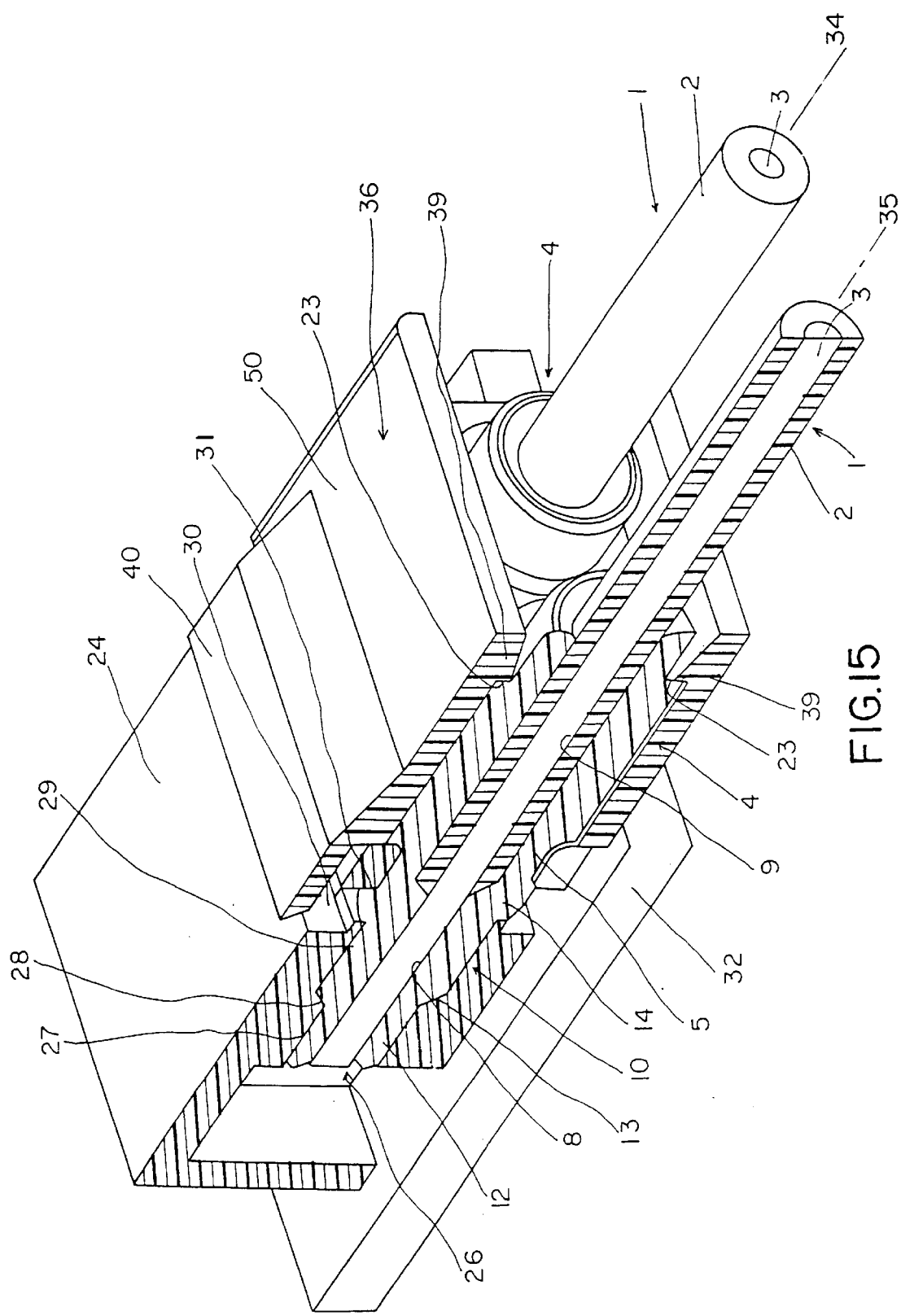
FIG. 15 is a vertical section taken generally along line 15—15 of FIG. 14.

In addition, it should be noted that because of the cylindrical shape of mating and holding means 10 of plug body 5 of plug connector 4, when a single plug connector is inserted into one of the cavities 25 or 26, the plug connector can be inserted in any circumferentially oriented position. In other words, the plug connector can be rotated about its longitudinal axis a full 360° for insertion into one of the plug-receiving cavities. While FIGS. 1–9 show a single plug connector inserted into a single cavity, FIGS. 10–12 show a pair of the plug connectors interengaged in parallel and inserted into both cavities 25 and 26 of assembly housing 24. Of course, when plural connectors are interconnected, a single connector no longer can be rotated about its axis. When the pair of connectors are inserted into the housing, the rearward engaging portions 7 of both of the connectors remain outside cavities 25 and 26. It should be understood that while only two connectors are shown coupled together in the embodiment illustrated herein, more than two connectors can be interengaged in parallel and inserted into an assembly housing that has more than one of the same cavities 25 and 26.

Figure 16:
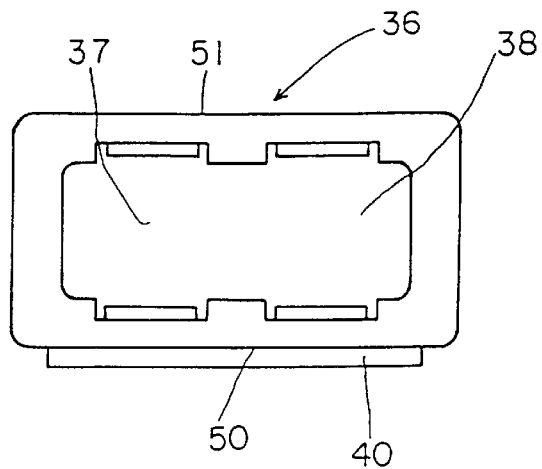
FIG. 16 is a front end elevational view of the holder.
Figure 17:
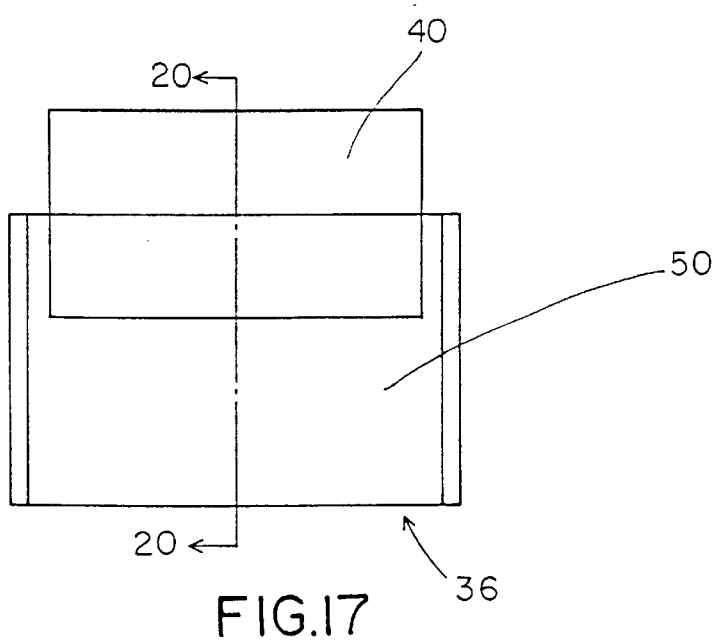
FIG. 17 is a top plan view of the holder.
Figure 18:
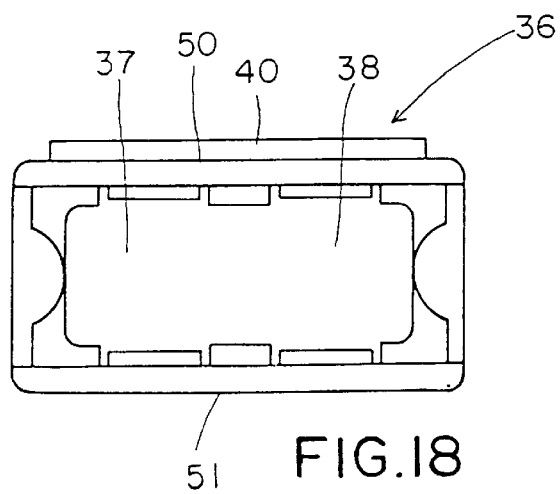
FIG. 18 is a rear end view of the holder.
Figure 19:
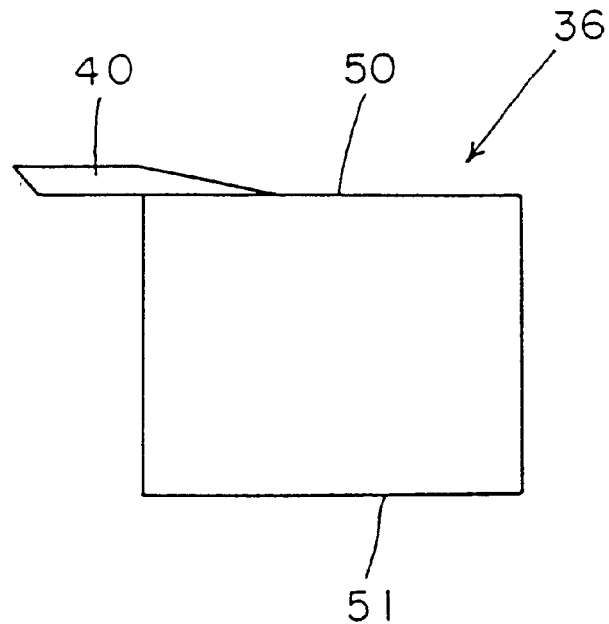
FIG. 19 is a side elevational view of the holder.
Figure 20:
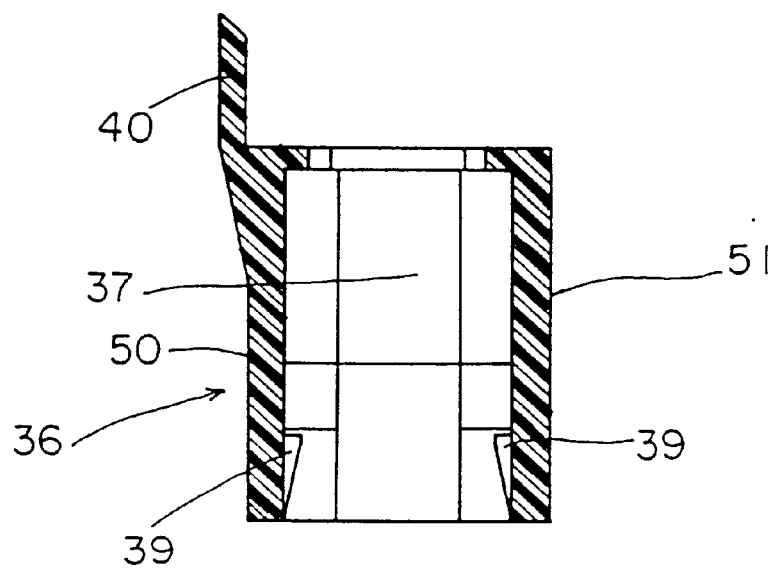
FIG. 20 is a vertical section taken generally along line 20—20 of FIG. 17.

FIGS. 13–20 show an embodiment of the invention which is identical to that shown in FIGS. 10–12, except that a plug connector holder, generally designated 36, has been added to securely hold the connectors in their parallel arrangement and also to hold the interengaged connectors to assembly housing 24. More particularly, holder 36 includes a pair of holding channels 37 and 38 for holding plug connectors 4 in parallel. In this embodiment, holding channels 37 and 38 communicate with each other as best seen in FIGS. 16 and 18.

Plug connector holder 36 is formed by upper and lower walls 50 and 51 within which stop pawls 39 (FIG. 20) are formed near the rear of the holder. An integral flange 40 projects forwardly of upper wall 50 at the front of the holder. The flange may have latch means for snapping into openings 30 in the top of assembly housing 24.

In using holder 36, a pair of plug connectors 4 are interengaged in parallel by means of male and female engaging portions 16 and 15, respectively, as described above. The interengaged plug connectors then are inserted into channels 37 and 38 of holder 36 until stop portions 23 on the plug bodies of the connectors become engaged with stop pawls 39 inside upper and lower walls 50 and 51 of holder 36. The holder then can be used to simultaneously insert the plug connectors into housing cavities 25 and 26 without any danger of the connectors becoming disengaged. The holder also can be used as a polarizing means to ensure that the two connectors are inserted into their proper cavities 25 or 26, because flange 40 will prevent the entire assembly from being inverted or turned upside-down and mated with the housing when mounted on a printed circuit board, for instance.

Figure 21:
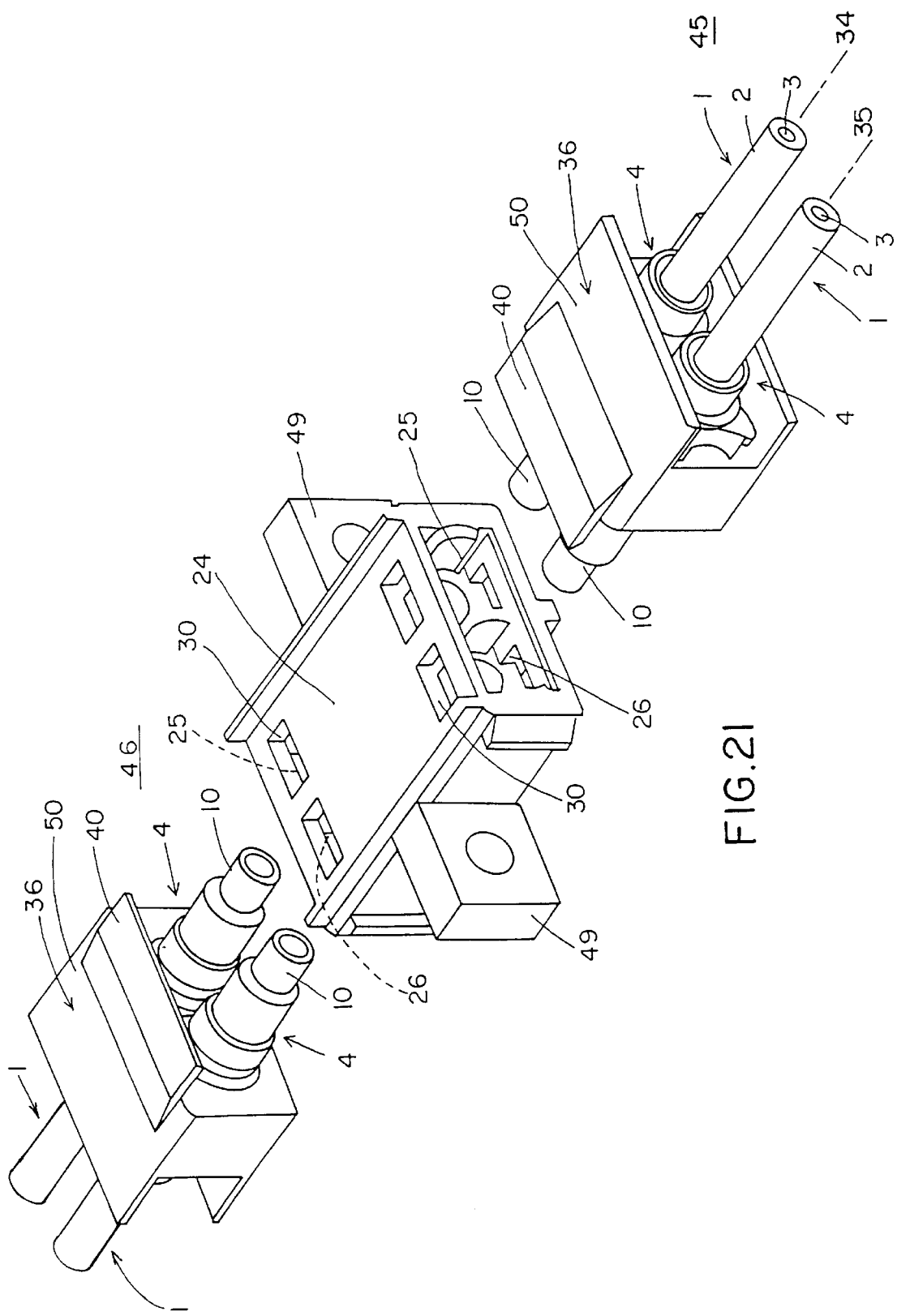
FIG. 21 is a perspective view of another embodiment of the invention wherein the housing is adapted for mounting in an opening in an appropriate panel.
Figure 22:
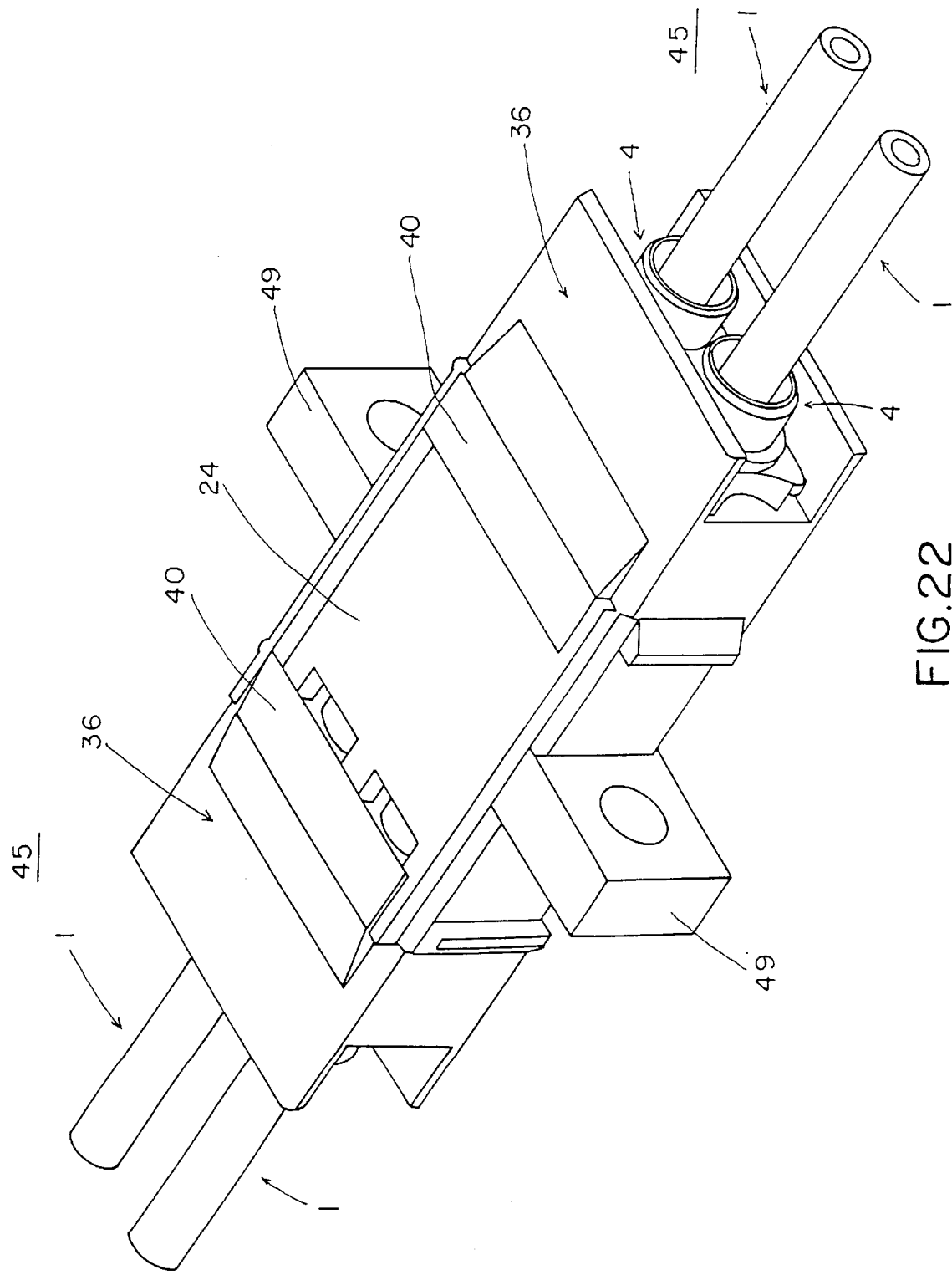
FIG. 22 is a view similar to that FIG. 21, but showing the connectors inserted into the housing and the holders latched to the housing.

FIGS. 21 and 22 show an embodiment wherein assembly housing 24 has dual mating ends for receiving a pair of plug connectors 4 at both opposite ends 45 and 46 of the entire optical fiber connector assembly. This system might be used, for instance, for interconnecting two pairs of fiber optic cables 1 from opposite sides of a panel. Therefore, the "double-ended" assembly housing 24 shown in FIGS. 21 and 22 would be mounted in an appropriate opening in a panel, and the housing is provided with ears 49 projecting outwardly from opposite sides thereof for securing the double-ended housing to the panel. With this arrangement, the cores 3 of fiber optic cables 1 at each end of the housing will be optically coupled through the panel from opposite sides thereof. Such a construction might be suitable for an optical fiber relay device, for instance. Otherwise, like reference numerals have been applied in FIGS. 21 and 22 corresponding to like components described heretofore.

Figure 23:
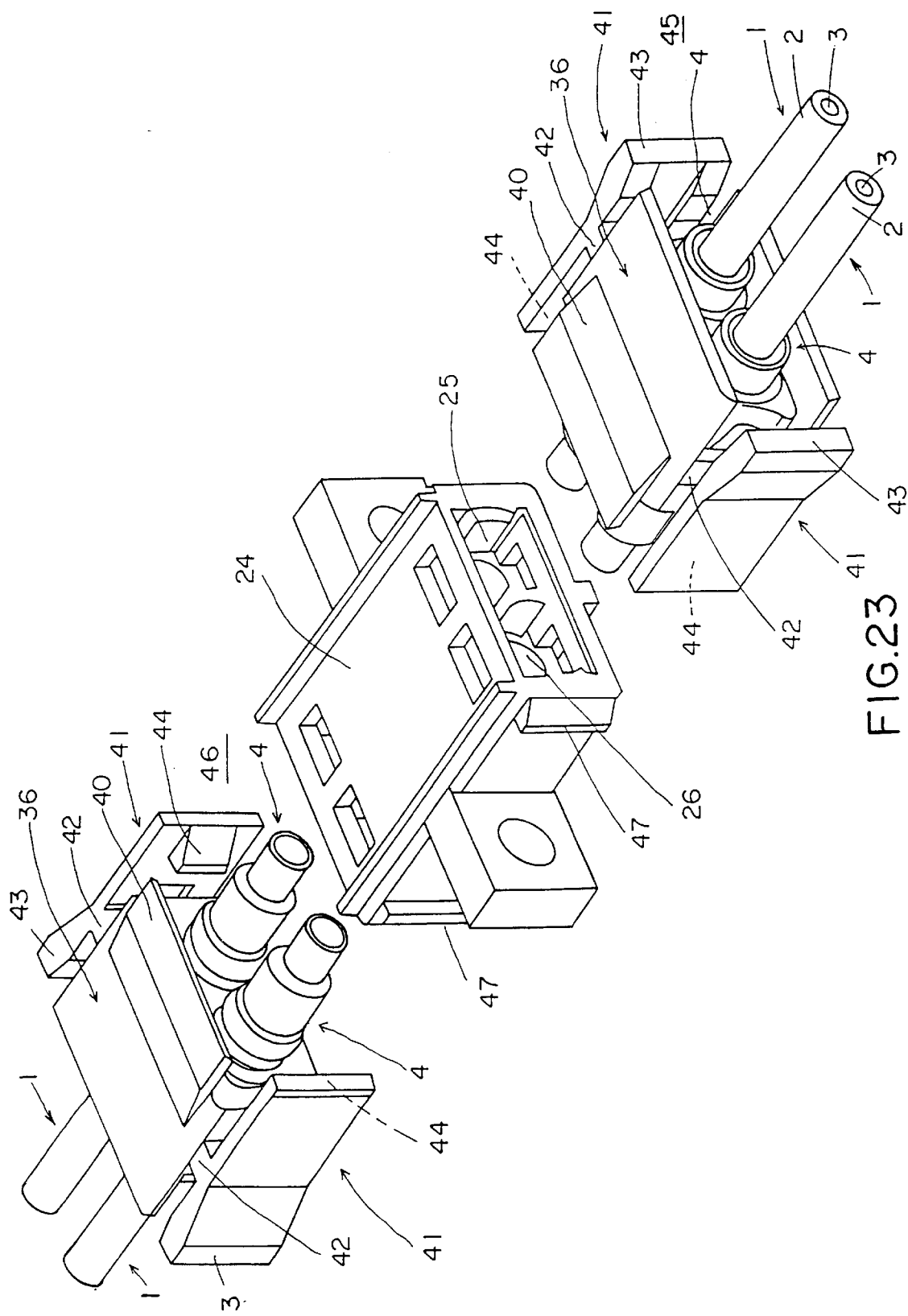
FIG. 23 is a perspective view of a further embodiment of the invention, including a different type of holder for the connectors.
Figure 24:
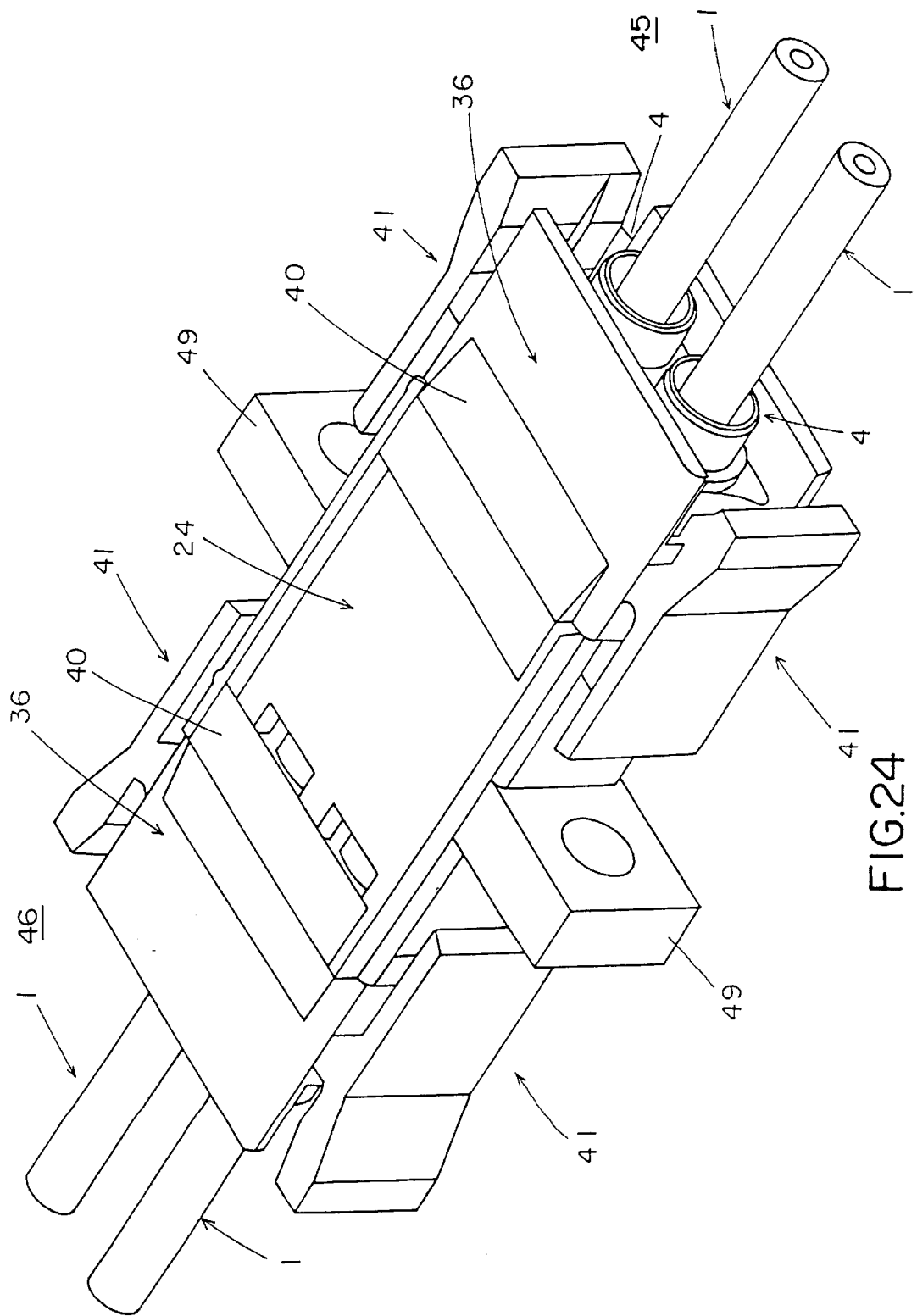
FIG. 24 is a perspective view of the assembly of FIG. 23, with the connectors inserted into the housing and the holders latched to the housing.
Figure 25:
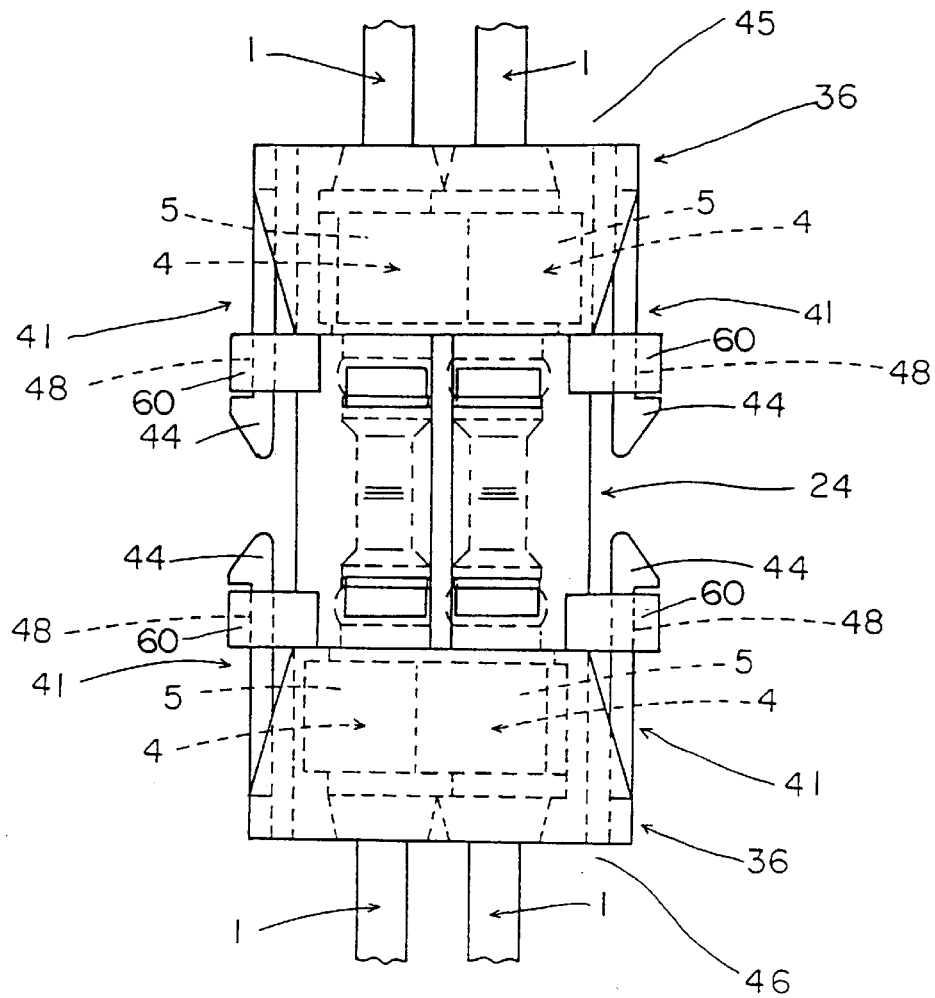
FIG. 25 is a top plan view of still another embodiment of the invention.
Figure 26:
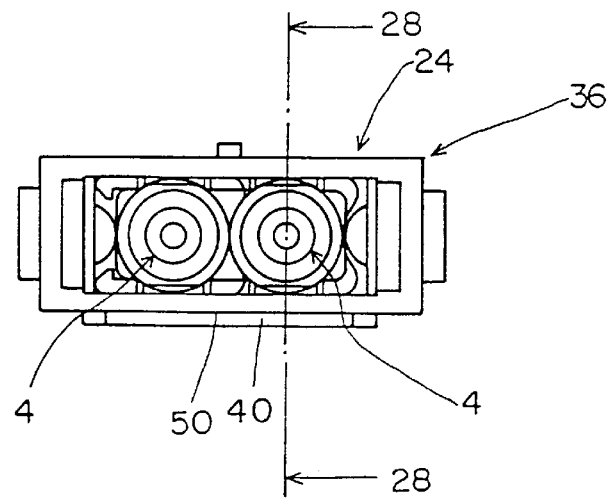
FIG. 26 is an end elevational view of the embodiment of FIG. 25.
Figure 27:
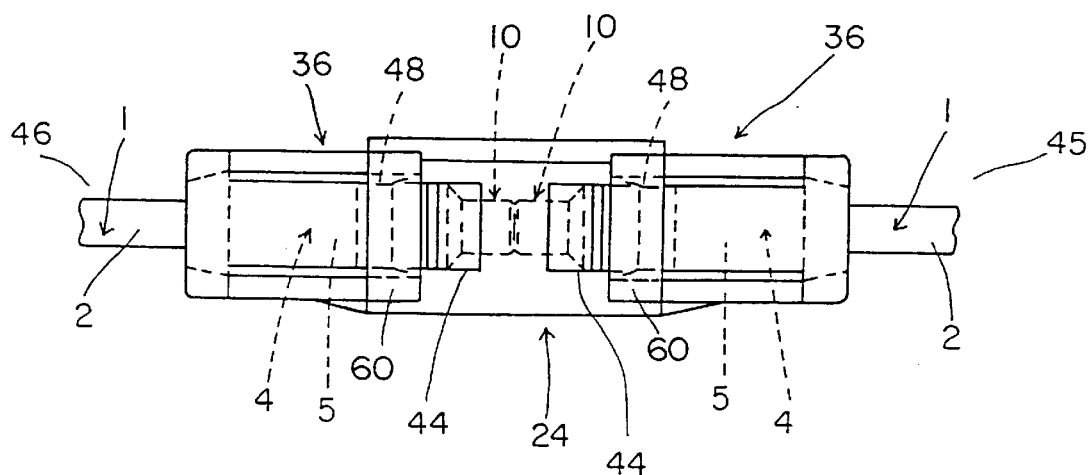
FIG. 27 is a side elevational view of the embodiment of FIG. 25.
Figure 28:
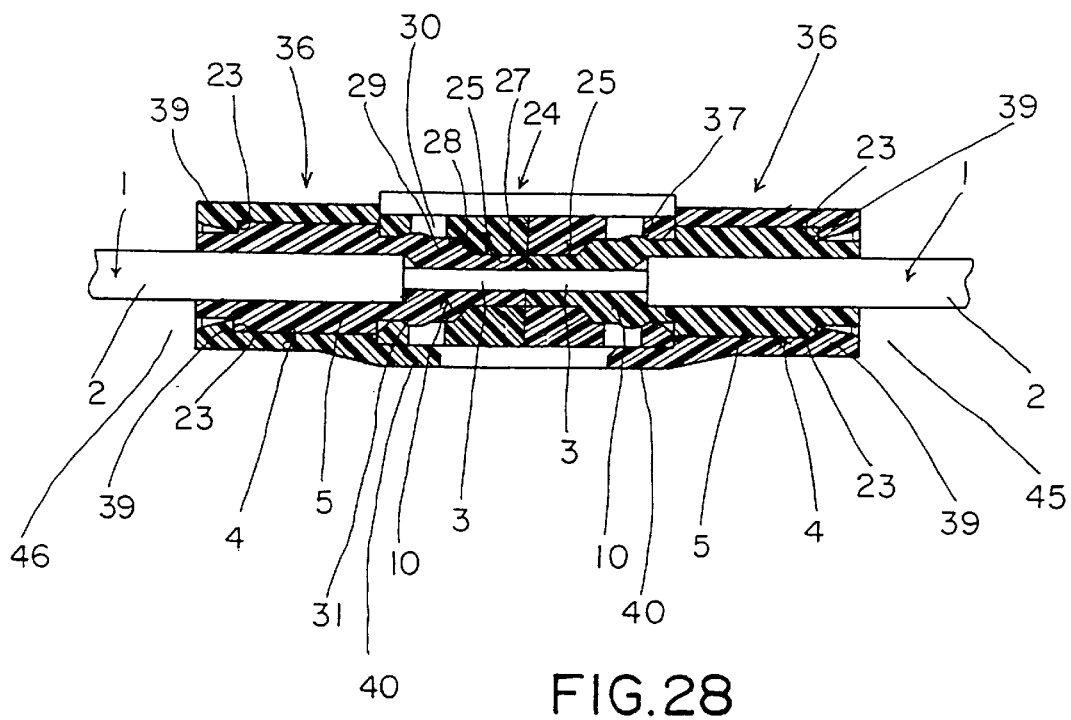
FIG. 28 is a vertical section taken generally along line 28—28 of FIG. 26.

FIGS. 23 and 24 show a further embodiment wherein holders 36 are provided with lock arms, generally designated 41, on opposite sides of the holders for engaging latch flanges 47 on assembly housing 24. More particularly, holders 36 may be unitarily molded of plastic material, and lock arms 41 may be integrally molded therewith by unitary pivot portions 42. Forward ends of the lock arms have latching hooks 44 for interengagement with latch flanges 47 of the housing. Rear ends 43 of the lock arms are provided for manual gripping by an operator.

When the pairs of plug connectors and cables are inserted into the assembly housing in the embodiment of FIGS. 23 and 24, the front end of lock arms 41 are spread apart because of the angled front surfaces of latch hooks 44. When the assembly is fully mated, the front ends of the latch arms spring back inwardly such that latch hooks 44 lock behind latch flanges 47 of assembly housing 24. When it is desired to unmate the connectors from the housing, an operator squeezes in on the rear ends 43 of lock arms 41 to spread apart the front ends of the lock arms and disengage latch hooks 44 from latch flanges 47.

Lastly, FIGS. 25–28 show a final embodiment of the invention which is substantially identical to the embodiment shown in FIGS. 23 and 24, except that holders 36 have forwardly projecting, cantilevered lock arms 41 with outwardly projecting latch hooks 44. These latch hooks snap within latch holes 48 inside a pair of latching bridges 60 formed at each opposite end of assembly housing 24.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. An optical fiber connector assembly, comprising:
   a connector housing having a plug-receiving cavity;
   a plug connector for terminating an optical fiber and including a forward mating end for surrounding a core of the optical fiber and a rearward engaging portion for selective interengagement with a second plug connector in parallel with the first plug connector, the forward mating end being insertable into the plug-receiving cavity of the connector housing while the rearward engaging portion is exposed exteriorly of the cavity when the mating end is fully inserted into the cavity;
   said rearward engaging portion of the plug connector includes one of a male engaging portion and a female engaging portion for interengagement with the other of the male engaging portion and female engaging portion on the second plug connector;
   said engaging portion on the plug connector is oriented for interengagement with the engaging portion of the second plug connector in a direction generally perpendicular to the direction of inserting the plug connector into said cavity; and
   wherein said plug connector includes a male engaging portion on one side thereof and a female engaging portion on an opposite side thereof.

2. The optical fiber connector assembly of claim 1 wherein said forward mating end of the plug connector is generally cylindrical, whereby the plug connector can be inserted into the cavity in any circumferentially oriented position independently of the second plug connector.

3. The optical fiber connector assembly of claim 1 wherein said engaging portion on the plug connector is oriented for interengagement with the engaging portion of the second plug connector in a direction generally perpendicular to the direction of inserting the plug connector into said cavity.

4. The optical fiber connector assembly of claim 1, including a holder for holding the two plug connectors in parallel interengagement.

5. The optical fiber connector assembly of claim 4, including complementary interengaging latch means between the holder and the connector housing.

6. The optical fiber connector assembly of claim 1 wherein said connector housing includes mounting ears for mounting the housing in an appropriate panel.

7. The optical fiber connector assembly of claim 1 wherein said connector housing including means for receiving an optical element on a printed circuit board.

8. The optical fiber connector assembly of claim 1 wherein said forward mating end of the plug connector is generally cylindrical and includes an enlarged diameter ring portion for frictional engagement within the cavity in the connector housing.

9. The optical fiber connector assembly of claim 1 wherein said plug-receiving cavity of the connector housing has independent cavity portions for respectively receiving the plug connectors.

10. An optical fiber connector assembly, comprising:

a connector housing having a plug-receiving cavity; and a plug connector for terminating an optical fiber and including a generally cylindrical forward mating end for surrounding a core of the optical fiber and allowing the plug connector to be inserted in the cavity in any circumferentially oriented position, the plug connector including a rearward engaging portion for selective interengagement with a second plug connector in parallel with the first plug connector, the engaging portion being oriented for interengagement with the second plug connector in a direction generally perpendicular to the direction of inserting the plug connector into said cavity, the forward mating end of the plug connector being insertable into the plug-receiving cavity of the connector housing while the rearward engaging portion is exposed exteriorly of the cavity when the mating end is fully inserted into the cavity; and wherein said rearward engaging portion of the plug connector includes one of a male engaging portion and a female engaging portion for interengagement with the other of the male engaging portion and female engaging portion on the second plug connector.

11. The optical fiber connector assembly of claim 10 wherein said plug connector includes a male engaging portion on one side thereof and a female engaging portion on an opposite side thereof.

12. The optical fiber connector assembly of claim 10, including a holder for holding the two plug connectors in parallel interengagement.

13. The optical fiber connector assembly of claim 12, including complementary interengaging latch means between the holder and the connector housing.

14. The optical fiber connector assembly of claim 10 wherein said connector housing includes mounting ears for mounting the housing in an appropriate panel.

15. The optical fiber connector assembly of claim 10 wherein said connector housing including means for receiving an optical element on a printed circuit board.

16. The optical fiber connector assembly of claim 10 wherein said forward mating end of the plug connector is generally cylindrical and includes an enlarged diameter ring portion for frictional engagement within the cavity in the connector housing.

* * * * *